(12) United States Patent
Lu et al.

(10) Patent No.: US 8,233,408 B2
(45) Date of Patent: Jul. 31, 2012

(54) MOBILE CLOUD ARCHITECTURE BASED ON OPEN WIRELESS ARCHITECTURE (OWA) PLATFORM

(76) Inventors: Wei Lu, Cupertino, CA (US); Dexi Lu, Cupertino, CA (US)

( * ) Notice: Subject to any disclaimer, the term of this patent is extended or adjusted under 35 U.S.C. 154(b) by 282 days.

(21) Appl. No.: 12/635,153

(22) Filed: Dec. 10, 2009

(65) Prior Publication Data

US 2010/0238840 A1    Sep. 23, 2010

(51) Int. Cl.
- *H04W 4/00*     (2009.01)
- *H04L 12/28*    (2006.01)
- *G06F 15/16*    (2006.01)
- *G06F 15/173*   (2006.01)
- *H04M 3/42*     (2006.01)

(52) U.S. Cl. ........ 370/259; 370/328; 370/338; 370/352; 370/401; 455/414.1; 455/432.1; 455/445; 709/203; 709/219; 709/223; 709/224; 709/226; 718/1; 726/6

(58) Field of Classification Search ............ 370/259, 370/328, 338, 352, 401; 455/414.1, 432.1, 455/445; 709/203, 219, 223, 224, 226; 718/1; 726/6
See application file for complete search history.

(56) References Cited

U.S. PATENT DOCUMENTS

| | | | |
|---|---|---|---|
| 6,880,002 B2 * | 4/2005 | Hirschfeld et al. | 709/223 |
| 7,283,838 B2 * | 10/2007 | Lu | 455/550.1 |
| 7,571,221 B2 * | 8/2009 | Rao et al. | 709/220 |
| 7,590,418 B1 * | 9/2009 | Thomson | 455/433 |
| 8,041,761 B1 * | 10/2011 | Banga et al. | 709/201 |
| 8,078,728 B1 * | 12/2011 | Pollan et al. | 709/226 |
| 2003/0126465 A1 * | 7/2003 | Tassone et al. | 713/201 |
| 2009/0300607 A1 * | 12/2009 | Ferris et al. | 718/1 |
| 2010/0027552 A1 * | 2/2010 | Hill | 370/401 |
| 2010/0169497 A1 * | 7/2010 | Klimentiev et al. | 709/228 |
| 2010/0217850 A1 * | 8/2010 | Ferris | 709/223 |
| 2010/0306377 A1 * | 12/2010 | DeHaan et al. | 709/226 |
| 2010/0306765 A1 * | 12/2010 | DeHaan | 718/1 |
| 2011/0055377 A1 * | 3/2011 | DeHaan | 709/224 |
| 2011/0055396 A1 * | 3/2011 | DeHaan | 709/226 |
| 2011/0055398 A1 * | 3/2011 | DeHaan et al. | 709/226 |
| 2011/0055588 A1 * | 3/2011 | DeHaan | 713/189 |
| 2011/0055823 A1 * | 3/2011 | Nichols et al. | 717/174 |
| 2011/0107103 A1 * | 5/2011 | Dehaan et al. | 713/171 |
| 2011/0126110 A1 * | 5/2011 | Vilke et al. | 715/736 |
| 2011/0126198 A1 * | 5/2011 | Vilke et al. | 718/1 |
| 2011/0131316 A1 * | 6/2011 | Ferris et al. | 709/224 |
| 2011/0131499 A1 * | 6/2011 | Ferris et al. | 715/736 |
| 2011/0138049 A1 * | 6/2011 | Dawson et al. | 709/226 |
| 2011/0138050 A1 * | 6/2011 | Dawson et al. | 709/226 |

* cited by examiner

*Primary Examiner* — Alpus H Hsu

(57) ABSTRACT

A simplified future mobile terminal system converging multiple wireless transmission technologies by utilizing a cost-effective and spectrum-efficient mobile cloud solution based on the innovative virtual mobile server system of the open wireless architecture (OWA) platform.

16 Claims, 4 Drawing Sheets

Virtual Mobile Server as Mobile Cloud Server

FIG.1 Architecture of Mobile Cloud Wireless Mobile Terminal

Call Processing Management in Mobile Switching Center or Gateway with VMS

Virtual Mobile Server as Mobile Cloud Server

| OWA SIG Header | OWA Signal Processing Information | OWA SIG End |
| OWA APP Header | OWA Application Processing Information | OWA APP End |
| OWA NET Header | OWA Networking Processing Information | OWA NET End |
FIG.4 Transmission Framework of Mobile Cloud OWA Interface
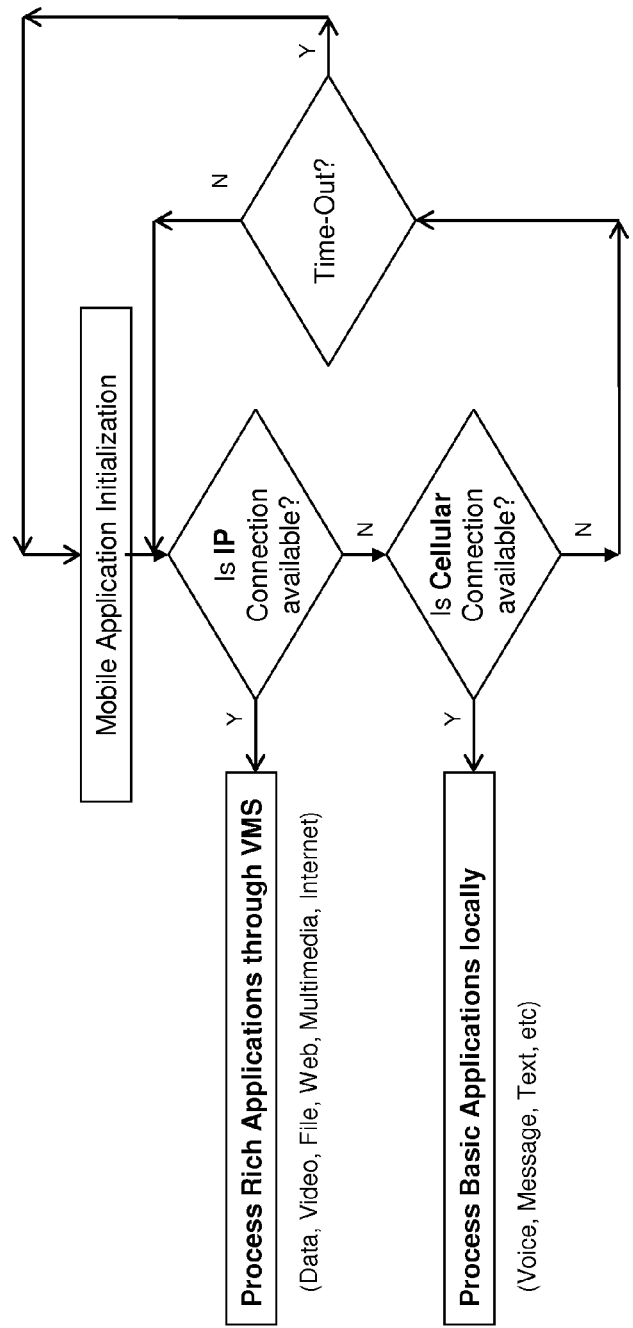
FIG.5 OWA Application Optimizer in Mobile Cloud Terminal System

MOBILE CLOUD ARCHITECTURE BASED ON OPEN WIRELESS ARCHITECTURE (OWA) PLATFORM

BACKGROUND OF THE INVENTION

1. Field of the Invention

This invention relates to developing the next generation mobile wireless communications in simplifying the mobile terminal system converging multiple wireless transmission standards by constructing the mobile cloud server-client architecture based on the open wireless architecture (OWA) technology platform. The invention discloses cost-effective and spectrum-efficient mobile cloud solutions by introducing the Virtual Mobile Server system associated with the OWA mobile terminal(s).

2. Description of the Related Art

Mobile communications have evolved rapidly on the worldwide basis. But when we look back at the wireless mobile communication history, two major issues remain unsolved:

1. The mobile wireless terminal architecture is too closed.
2. The mobile wireless terminal system is too complicated.

The wireless transmission theory tells us that no single wireless transmission technology can provide both broadband high-speed radio transmission and seamless fast mobility capability in a mobile fast-fading propagation model environment unless we reduce the mobile network capacity tremendously.

Our research shows that when the transmission bandwidth is enough, the information processing consumes much more resources and energies than the transmission processing.

In order to solve the above two problems in mobile communications, let us analyze the current situations first.

In many countries, wireline Internet access in home, office and public area becomes very popular and affordable. Meanwhile, WLAN (wireless local area network) access is evolving rapidly in these domains.

Second generation (2G) wireless mobile systems were mainly designed for applications such as voice. Third generation (3G) and especially, fourth generation (4G) mobile system will increasingly be designed as combination of different access technologies to complement each other in an optimum way for different service requirements and radio environments in order to provide a common and flexible service platform for different services and applications.

Access to a service or an application may be performed using one system or may be performed using multiple systems simultaneously or alternatively. Specifically, as will be described within the context of the present invention and has not been addressed in the art, such improved technology could include an integrated and converged communication system which will combine the wireless mobile communication, wireline communication, wireless local area network, broadband wireless access system and Internet into one common platform so that the single Mobile Terminal can operate as a home phone, office phone, mobile phone and open terminal with single user number, which is the unique identifier of this integrated mobile communication terminal.

In future, operators may deploy a mix of technologies that could, at various stages in time and subject to market and regulatory considerations, incorporate cellular, WLAN (wireless local area network), WMAN (wireless metropolitan area networks) or called BWA (broadband wireless access), WPAN (wireless personal access network), digital broadcast, satellite and other access systems as discussed by the present invention. This will require the seamless interaction of these systems in order for the user to be able to receive a variety of content via a variety of delivery mechanisms depending upon the particular terminal capabilities, location and user profile.

Different radio access systems will be connected via the open and flexible core networks. In this way, an individual user can be connected via a variety of different access systems to the networks and services he desires. The integration and convergence between these different access systems in terms of horizontal and vertical handover and seamless service provision with service negotiation including mobility, security and QoS management will be a key requirement.

Due to the different application areas, cell ranges and radio environments, the different access systems can be organized in a layered structure similar to hierarchical cell structures in cellular mobile radio systems. The different layers correspond to the:

- Distribution layer: This layer comprises digital broadcast type systems to distribute the same information to many users simultaneously through unidirectional links.
- Cellular layer: The cellular layer may comprise several cell layers with different cell size and or different access technologies.
- Hot spot layer: This layer may be used for very high data rate applications, very high traffic density and individual links, e.g. in very dense urban areas, campus areas, conference centers, and airports.
- Personal network layer: Personal area networks will support short range high-speed direct communication between devices around the users.
- Fixed (Wired) layer: This layer includes any fixed wireline access system.

Such an integrated mobile terminal system as provided by the present invention could intelligently converge mobile communications, Internet, wireline communications, wireless LAN, wireless MAN, wireless PAN, etc. into an open system platform. Each of these represents a variety of applications, services and delivery mechanisms. These differing information flows are desired by the users to be available regardless of the means and manner of delivery. The most important is, this mobile terminal becomes the All-in-One common personal communicator at both home and office or on-the-move with unified single telephone number.

It is well predicted that 2G (second generation), 3G (third generation in its present state), 4G (fourth generation), future mobile access and nomadic/local area wireless access elements are considered to be a system as a whole in the future. This converged and integrated communication platform as disclosed by the present invention, rather than separate and single mode of standard, will definitely drive the future telecommunication industry, but with new business model for service providers and operators.

Continuous evolution is foreseen in future mobile terminals, with use of new components, architectures, hardware, software platforms and improved user interfaces together providing increased performance. The key technologies that will enable the future advanced mobile terminals as described in the present invention include:

- Open Wireless Architecture (OWA) supporting multiple standards efficiently
- Mobile Cloud technology to simplify the mobile terminal architecture
- Smart antennas and new space/time coding and decoding techniques
- High efficiency power amplifiers and filters
- Improved RF (radio frequency) modules, allowing higher operating frequencies and improved receiver sensitivity Advances in signal processing, increased processing efficiency Improved battery technology with increased energy density High-performance and low-power signal processing and processor platform based on OWA Integration and convergence with wired terminal An unified global standard of mobile communications becomes extremely difficult and almost impossible. An Open Wireless Architecture (OWA) based converged wireless platform will thus become reasonable and feasible in both business and technology, and therefore ITU (international telecommunication union) IMT-Advanced standardization has been targeting this direction in long run.

Open Wireless Architecture (OWA) technology is one optimal solution for the Fourth Generation wireless and mobile communications (4G) on the worldwide basis. OWA refers to the open broadband wireless platform that can support diverse wireless and mobile standards, and can converge multiple wireless networks. To achieve this flexibility, OWA focuses on all aspects of a communication system including RF (radio frequency), baseband processing, networking and application segments. The flexibility and adaptability required for the converged open wireless platform can be achieved by defining the open interface parameters for the OWA systems and networks.

OWA helps in realizing global roaming facilities and seamless networking capabilities amongst different radio transmission technologies. It allows the network operators and subscribers to use third party solutions or user-defined solutions on their systems and to customize their systems according to their business models. Using OWA we can build systems which support multiple standards, multiple bands, multiple modes and offer diverse services to the customers.

OWA is different from SDR (software defined radio) as OWA basically maps various wireless standards into open interface parameters and maintain the system platform including RF, baseband, networks and applications an open architecture. Hence, in OWA systems, different modules (both hardware and software) can be from different vendors. It is similar to the open computer architecture in personal computer system and open network architecture in packet router system.

However, SDR is primarily a radio in which the preset operating parameters including inter alia frequency range, modulation type, and/or output power limitations can be reset or altered by software in order to support different radio frequency bands and/or standards. Though SDR has been improved a lot to support re-configurability and flexibility, it is a closed architecture in coupling different radios into one broadband transceiver. In other words, SDR consumes much more power and spectrum in exchange of the system flexibility. From the business point of view, SDR is not a cost-effective solution in wireless communications.

Furthermore, SDR uses broadband transceiver to support multiple wireless standards which is very expensive in the commercial environment. However, OWA converges multiple air interfaces in an open system platform to maximize the transmission bandwidth and system performance, but each wireless transmission still uses the narrowband transceiver, therefore maintaining the system in a cost-effective way which is very important for the commercial business.

By using OWA technology, we can converge multiple wireless standards in one open system to support both broadband high-speed radio transmission and seamless fast mobility capability in a mobile fast-fading propagation model environment while maintaining the very high mobile network capacity for the commercial mobile business.

In addition, OWA allows allocating multiple air interfaces into an external card so that the users can simply change wireless standards by updating such air interface card without having to change the mobile terminal device or terminal system.

Now, how to simplify the mobile terminal system?

Our mobile research results tell us when the transmission bandwidth is enough, the information processing consumes much more resources and energies than the transmission processing in the mobile terminal system. If we can reduce the processing burdens in the mobile terminal including baseband signal processing, application processing and networking processing, the overall system resources and power can be tremendously minimized and the system can be simplified.

The aforementioned OWA technology platform has secured enough transmission bandwidth by converging multiple wireless standards in one common platform so that the mobile terminal can be optimized for best-of-effort high-speed transmission.

By employing a computer server with a home IP address as the Virtual Mobile Server, we can configure this server as the mobile cloud serve to handle the processing tasks for the mobile terminal system which becomes the mobile cloud client accordingly.

When the IP (Internet Protocol) connection is available for the mobile terminal based on OWA network access solution, the aforementioned mobile terminal moves its resource-consuming processing tasks to the remote virtual mobile server through IP connection, so that most of the processing tasks in the mobile terminal are done in the virtual mobile server instead.

Based on the above mobile cloud architecture, the mobile terminal system becomes very simple with basic functions of Transceiver, User Interface and Information Display only.

The OWA mobile cloud architecture of the present invention is a revolutionary approach in developing the next generation mobile wireless communications based on the OWA technology platform which basically discloses the following three major inventions for the future mobile terminal system:

1. OWA provides multiple wireless transmissions solution without relying on the broadband transceiver,
2. OWA provides broadband high-speed transmission while securing seamless mobility capability,
3. OWA provides cost-effective and spectrum-efficient mobile cloud solutions by introducing the Virtual Mobile Server platform.

SUMMARY OF THE INVENTION

This invention is directed to a simplified mobile terminal system based on OWA (open wireless architecture) mobile cloud architecture to support the convergence and integration of various wireless standards including existing and future mobile cellular standards, wireless local area network standards, wireless personal area network standards, broadband wireless access standards and wireline standards. The mobile cloud architecture comprises the virtual mobile server as the mobile cloud server and the mobile terminal as the mobile cloud client.

The OWA mobile cloud architecture, as set forth above, tremendously reduces the processing tasks in the mobile terminal system by moving much processing tasks remotely to the virtual mobile server through IP connection based on OWA network access control.

The invention of this OWA mobile cloud architecture includes the following main parts:

First, the OWA mobile cloud architecture of the present invention incorporates an OWA mobile terminal integrating the Wireless LAN technology, Wireless PAN technology, Wireless MAN technology and Wireline Internet Access technology with the common air interfaces mobile cellular communication standards (for example, cdma2000, WCDMA, GSM, GPRS, TD-SCDMA, OFDM, WiMax, etc., but not limited thereto) through the Open Wireless Architecture (OWA) platform of the present invention. OWA defines the open interface standard for each subsystem and function unit so that the system is open for upgrade and reconfiguration. The method of present invention supports any short range wireless access technologies including Wireless LAN, Wireless MAN and Wireless PAN, but not limited thereto. Also, as utilized hereinafter the term "common air interface mobile standards" refers to any type of mobile cellular technology operable in the fashion of "TDMA (time division multiplex access) or CDMA (code division multiplex access) or OFDM (orthogonal frequency division multiplex)", but not limited thereto.

Second, the OWA mobile terminal of the present invention supports multiple standards of both wireless and wireline communications wherein Software Defined Module (SDM) is used to install or update the different communication standards module. This SDM can be stored in an External Card, for example, flash memory card, SIM (smart integrated memory) card, or downloadable from the Internet. The External Card of the SDM may also contain independent processor, DSP (Digital Signal Processor) or other components in addition to memory unit to facilitate additional system processing.

Third, the OWA mobile terminal of the present invention incorporates automatic network access capabilities, wherein the mobile terminal system searches the available network access in the order of wired network, Wireless LAN, Wireless PAN, BWA (broadband wireless access), mobile cellular network for example, but not limited thereto. The search order can be updated or managed by the user. When the wired network is detected, this mobile terminal becomes the wireline terminal and the communication is established by IP connection including IP data, IP video and VoIP for voice, etc. If wired network is not available, and Wireless LAN is detected, this mobile terminal becomes the Wireless LAN terminal and the communication is established by IP connection too. Wireless LAN access is regarded as the wireless extension of the wireline network access in the local short range domain. If both wired network and Wireless LAN are not available, the mobile terminal system of the present invention will search other short range wireless access networks including Wireless PAN, etc., or search broadband Wireless Metropolitan Area Networks (Wireless MAN) for wireless IP connection. In the event that all these networks are not detected, the mobile terminal will switch back to the mobile cellular mode wherein cellular mobile air interface standards (for example, GSM/GPRS, cdma2000, WCDMA, TD-SCDMA, etc., but not limited to) will be employed based on the mobile preference list set by the user. The mobile cellular air-interface modules supported in the mobile terminal of the present invention can be stored in the terminal itself, or in the External Card or downloaded from the Internet in the form of the aforementioned SDM. The mobile terminal associated with the OWA mobile cloud of the present invention is therefore capable of being operative in an open wireless and wireline communication environment supporting various standards and interfaces.

Fourth, the OWA mobile terminal of present invention incorporates a new incoming Call Processing Management capability in the Mobile Switching Center (MSC) and/or Mobile Gateway or Mobile Router, wherein the incoming mobile calls associated with the called mobile phone number are queued for further connecting to the destination mobile terminal based on the Connection Table containing the current network access status of the destination mobile terminal as set forth above. If this destination mobile terminal connects to the wired Internet network (first priority for example) or Wireless LAN or Wireless PAN or Wireless MAN, the aforementioned incoming call is forwarded to the destination mobile terminal directly through IP connection by IP-calling from MSC to the destination mobile terminal as set forth above, wherein the Visitor IP address reported by the destination mobile terminal is dialed. If the destination mobile terminal, as set forth above, does not connect to either the wired network or the wireless LAN or the wireless PAN or the wireless MAN, but connects to the mobile cellular network (for example, TDMA or CDMA or mobile OFDM), the aforementioned incoming call is forwarded to the associated Base Station wherein the communication with the destination mobile terminal is over the wireless cellular air link (through allocated mobile cellular transmission channel) of available mobile cellular standards. In case the destination mobile terminal, as set forth above, is not able to access any above available networks, the MSC then forward the aforementioned incoming call to a Computer Server which is configured as a Virtual Mobile Server called Mobile Cloud Server through IP connection, as will be described within the context of the present invention.

To simplify the system implementation and maximize the system performance of the aforementioned mobile terminal, in case the incoming call is a rich-application call (consuming much transmission bandwidth and processing resources) such as video call or large file call, etc., but the IP connection is not available, the aforementioned mobile terminal may request the aforementioned MSC to reroute the incoming call to the aforementioned virtual mobile server without connecting this incoming call to the aforementioned mobile terminal to save both wireless system and wireless transmission resources.

Fifth, the OWA mobile cloud of the present invention comprises the utilization of the computer server with Internet access as the Virtual Mobile Server (also called Mobile Cloud Server), as set forth above, supporting the aforementioned mobile terminal of the present invention with enhanced functions and services, for example, mobile secretary, mobile office, mobile Internet optimization server, mobile Internet applications server, Voice and Video server, Short Message Service (SMS) server, Multimedia Message Service (MMS) server, aforementioned SDM center and Document Center, etc. This Virtual Mobile Server, as set forth above, also takes the function of Special Service Management for the aforementioned mobile terminal on mobile location, emergency call, information collection, security and safety control, sensor network control and OWA mobile cloud O&M (Operation and Maintenance), etc. Additionally, one Virtual Mobile Server, as set forth above, can support one or multiple mobile terminals of the present invention, wherein many such mobile terminals can share the same aforementioned Virtual Mobile Server.

For the OWA mobile cloud architecture of the present invention, the aforementioned virtual mobile server comprises an important Terminal Processing Unit which operates the OWA Interface processing, base-band signal processing, application processing and networking processing for the mobile terminal, as set forth above.

The aforementioned virtual mobile server may also include a Mobile Internet Applications server for the aforementioned mobile terminal when the IP connection between them is available.

The aforementioned virtual mobile server is a very important system for the OWA mobile cloud architecture which is utilized for mobile cloud server processing for the mobile terminal(s), hosting various mobile applications and maintaining the aforementioned SDM air interfaces modules for one or multiple mobile terminals, as set forth above.

Sixth, the OWA mobile cloud architecture of the present invention defines a new OWA Interface to maximize the information transmission efficiency between the aforementioned mobile terminal and the aforementioned virtual mobile server.

Seventh, the OWA mobile terminal of the present invention supports open interface between the main functional units of the mobile terminal and the RF/IF (radio frequency/intermediate frequency) subsystem so that the mobile terminal RF/IF part is portable and reconfigurable.

As a conclusion, the OWA mobile cloud architecture of the present invention is a revolutionary approach in developing the next generation mobile wireless communications based on the OWA technology platform which basically discloses the following three major inventions for the future mobile terminal system:
1. OWA provides multiple wireless transmissions solution without relying on the expensive broadband transceiver,
2. OWA provides broadband high-speed transmission while securing seamless mobility capability,
3. OWA provides cost-effective and spectrum-efficient mobile cloud solutions by introducing the Virtual Mobile Server platform.

All these and other introductions of the present invention will become much clear when the drawings as well as the detailed descriptions are taken into consideration.

BRIEF DESCRIPTION OF THE DRAWINGS

For the full understanding of the nature of the present invention, reference should be made to the following detailed descriptions with the accompanying drawings in which:

FIG. 4 is a transmission framework of mobile cloud OWA Interface for communicating between the mobile terminal and the virtual mobile server.

FIG. 5 discloses an OWA application optimizer in the mobile terminal to manage the mobile application processing either through the virtual mobile server or locally in the mobile terminal.

Like reference numerals refer to like parts throughout the several views of the drawings.

DESCRIPTION OF THE PREFERRED EMBODIMENT

The present invention relates to a mobile cloud architecture based on OWA platform wherein the processing tasks of the mobile terminal including base-band signal processing, application processing and networking processing can be allocated to the virtual mobile server which is a computer server with home IP address or assigned roaming IP address by the aforementioned home IP address when an IP connection is set up between the mobile terminal and the virtual mobile server. Such IP connection is established when the mobile terminal connects to a wireline network, a short range wireless access network (for example, Wireless LAN and Wireless PAN, but not limited thereto) or a broadband wireless metropolitan area network (Wireless MAN, for example, Broadband Wireless Access system, but not limited thereto). In this way, the mobile terminal's system complexity can be tremendously reduced, the processing power consumption can be greatly decreased and the system performance is maximized accordingly.

Figure 1:
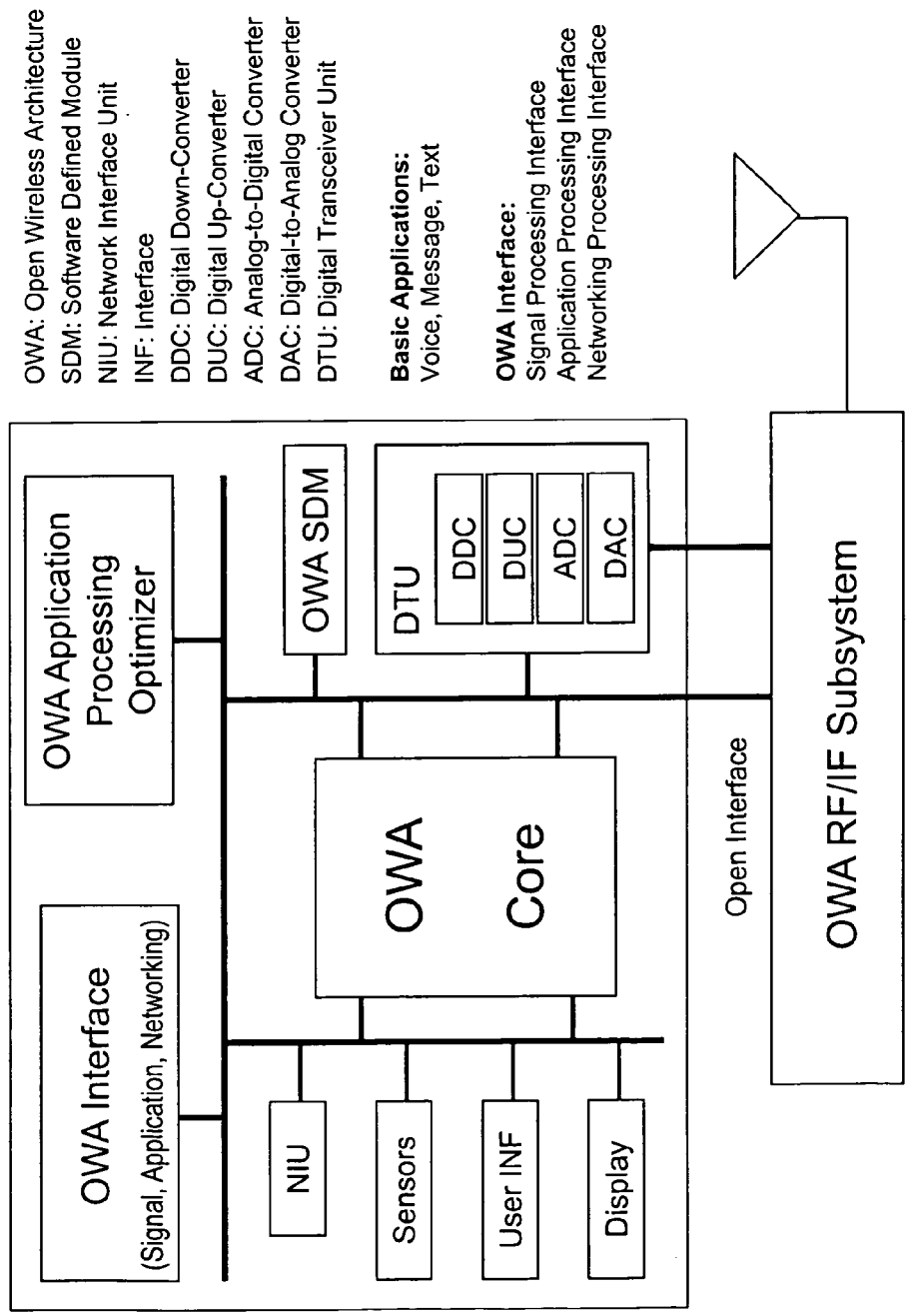
FIG. 1 is an Architecture of Mobile Cloud wireless mobile Terminal, wherein main functional modules of this invention are disclosed.

FIG. 1 is an architecture of mobile cloud wireless mobile terminal of the present invention, wherein the key functional units are:

Open Wireless Architecture (OWA) Interface—this software unit is utilized for the communication of various processing data and controls (including base-band signal processing, application processing and networking processing, but not limited to) between the mobile terminal and the virtual mobile server, as set forth above. Open architecture is very important for next generation communication systems because it allows different modules and subsystems to be provided by various different vendors through the open interface standards. OWA is different from SDR (software defined radio) as OWA basically maps various wireless standards into open interface parameters and maintain the system platform including RF, baseband, networks and applications an open architecture. Hence, in OWA systems, different modules (both hardware and software) can be from different vendors. It is similar to the open computer architecture in personal computer system and open network architecture in packet router system.

However, SDR is primarily a radio in which the preset operating parameters including inter alia frequency range, modulation type, and/or output power limitations can be reset or altered by software in order to support different radio frequency bands and/or standards. Though SDR has been improved a lot to support re-configurability and flexibility, it is a closed architecture in coupling different radios or modules into one broadband transceiver. In other words, SDR consumes much more power and spectrum in exchange of the system flexibility. From the business point of view, SDR is not a cost-effective solution in commercial wireless communications.

The OWA Interface of the present invention optimizes the transmission efficiency between the mobile terminal and the virtual mobile server, as set forth above.

OWA Software Defined Module (SDM)—this functional module supports multiple wireless standards (air-interfaces) for the mobile terminal of the present invention. The module can be stored in the aforementioned mobile terminal, or in the external card or downloaded from the Internet. The OWA of this invention supports open air interfaces so that users can change different wireless standards, including existing standards or future standards, by updating or replacing this SDM module, as set forth above, wherein this SDM module may further contain independent processors or DSP (Digital Signal Processing) components in addition to memory units to facilitate signal processing and/or protocol processing of related standards, etc.

OWA Core—this functional module provides basic multi-dimensional OWA open baseband processing of multiple wireless standards to ensure the fully operational and efficient capability of OWA digital transceiver working in an open wireless environment. It also schedules the signal processing tasks between the local processing unit and the remote processing unit in the virtual mobile server, as set forth above.

OWA Application Processing Optimizer—this module schedules the basic applications (such as voice, short message, text, but not limited thereto) locally in the mobile terminal or the rich applications (such as video, big file, large data, web, multimedia, but not limited thereto) remotely through the aforementioned virtual mobile server.

Radio Frequency (RF)/Intermediate Frequency (IF) Subsystem is a portable radio unit with open interface to the main functional units of the mobile terminal of the present invention. This separate open radio subsystem is necessary to support various wireless standards running in different frequency bands, wherein the user may change this radio part in case of needs. Additionally, this open radio subsystem supports new wireless transceiver technologies, for example, smart antennas, MIMO (Multiple Input, Multiple Output), High efficiency power amplifiers, Improved RF modules allowing multiple operating frequencies and improved receiver sensitivity, etc., but not intended to be limited to such technologies.

Network Interface Unit (NIU) is used to provide wireline network connection and wired communication interface for the mobile terminal of the present invention.

User Interface (INF) unit is used to provide user-machine interfaces including keyboard input, touch-screen input, information recognition input, wireless input, optical input and user information output, etc., but not limited thereto.

Display Unit is to generate the results of signal processing, application processing and networking processing, etc.

Sensor Unit is used to provide interfaces to different sensors of security, health, safety, location, automation and intelligence, etc., but not limited thereto.

Digital transceiver unit includes digital down-converter, digital up-converter, analog-to-digital converter and digital-to-analog converter.

Figure 2:
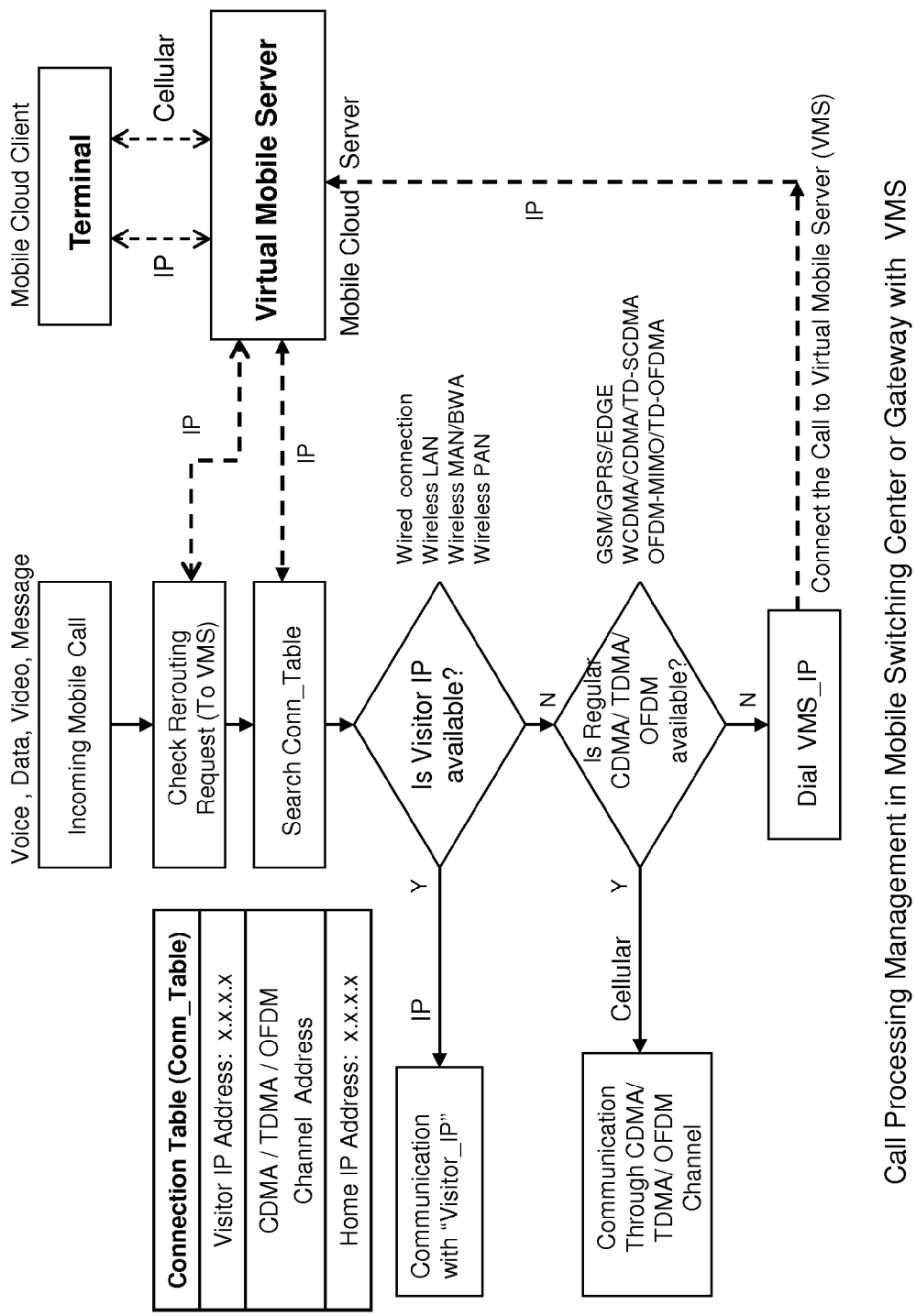
FIG. 2 is the incoming Call Processing Management in Mobile Switching Center or Mobile Gateway with Virtual Mobile Server, wherein the incoming mobile calls are further forwarded to the aforementioned mobile terminal through IP link or over the mobile cellular air link channel.

FIG. 2 shows the incoming Mobile Call Processing Management in the home Mobile Switching Center (MSC) or Mobile Gateway, associated with the mobile terminal of the present invention, wherein the key control procedures are:

Firstly, the aforementioned MSC checks whether the mobile terminal has requested MSC to reroute its incoming call to the virtual mobile server (a computer server with Internet connection of a home IP address), as set forth above, without connecting to the mobile terminal. This request is necessary when the mobile terminal does not have an IP connection, but the incoming call contains large big file or long video file, etc., or when the mobile terminal is busy and does not want to accept new calls consuming too much wireless bandwidth or system resources, etc. If no such rerouting request is received in the aforementioned MSC, then it proceeds to the next step.

The Connection Table (Conn_Table) is frequently updated by the mobile terminal, as set forth above, through specific network connections, wherein "Visitor IP address" is reported in case of wired network connection or short range wireless access connection (for example, WLAN or WPAN) or broadband wireless access network connection based on IP connection. If there are no such IP connections available with the aforementioned mobile terminal, the MSC, as set forth above, together with associated base stations, communicates with this mobile terminal over the mobile cellular networks, for example, CDMA networks, TDMA networks or OFDM networks, but not limited thereto, wherein the specific cellular air-link channel address is reported to the aforementioned Connection Table.

When an incoming mobile call is received and there is no rerouting request (rerouting to virtual mobile server) from the mobile terminal, the aforementioned MSC searches the Connection Table associated with the called mobile terminal (or the destination mobile terminal in this case) of the present invention. If a Visitor IP address is found, the MSC dials or re-synchronizes this IP address, through IP Switch in MSC (or other IP system in different infrastructure), to establish the IP connection accordingly. If this Visitor IP address is not available, and the regular mobile cellular channel address (for example, CDMA, TDMA or OFDM channel address) is found and associated with the called destination mobile terminal number, the MSC connects the associated base station to establish the communication with the destination mobile terminal, as set forth above, over the mobile cellular air link/channel. This mobile cellular channel can be either static channel or dynamically assigned channel to optimize the wireless spectrum utilization.

However, it is emphasized that the OWA mobile cloud infrastructure of the present invention utilizes the terms "MSC, Mobile Gateway, base station, etc.", which in the context of the present invention, is meant to include the aforementioned existing CDMA system, TDMA/GSM system, OFDM system, or any other mobile communication infrastructure utilizing different network topology and/or network architecture with different terms which may or may not have all of the functional characteristics of existing CDMA or TDMA or OFDM standards. As such, the OWA mobile cloud infrastructure of the present invention is not meant to be limited to current mobile cellular communication infrastructure, and the subsequent specific description utilization and explanation of certain characteristics previously recited as being characteristics of a MSC or base station or Mobile Gateway or Mobile Router are not intended to be limited to such technology.

If after searching the Connection Table, as set forth above, both Visitor IP address and mobile cellular channel address (including CDMA or TDMA or OFDM channel) are not found, the aforementioned MSC has to forward the incoming call, over IP connection through possible IP Switch, but not limited thereto, to the aforementioned virtual mobile server, wherein a fixed Home IP address is stored in the aforementioned Connection Table.

Therefore, the incoming mobile call processing management in MSC (or Mobile Gateway in packet mobile core networks) of the present invention requires the minimum modification of the existing mobile communication infrastructure, wherein only the aforementioned Connection Table is updated in the MSC, as set forth above.

The aforementioned mobile terminal of the present invention searches for the access networks in the priority order of Wired network, Wireless LAN, Wireless MAN (including BWA), TDMA, CDMA and OFDM, for example but not limited to, to maximize the wireless spectrum utilization efficiency and broadband services. However, this access control order can be re-defined by the user with the mobile terminal of the present invention. Additionally, the OWA mobile terminal of the present invention has the function to frequently search for the higher priority network access mode whenever the connection is in the low priority mode to optimize the network access control for the mobile terminal of the present invention.

Figure 3:
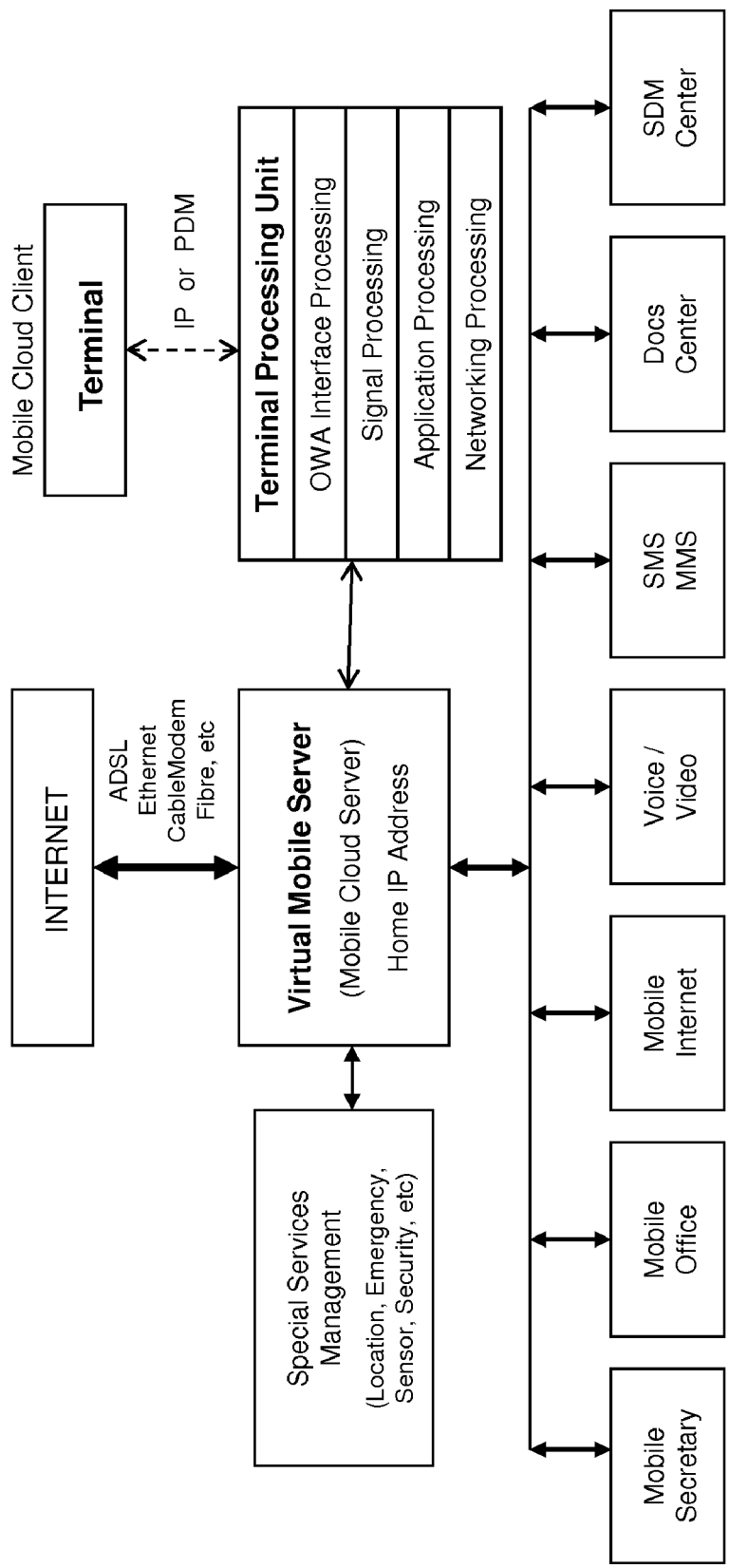
FIG. 3 introduces the Virtual Mobile Server as the mobile cloud server, wherein the mobile terminal processing tasks are executed in this server over the cloud which include the OWA interface processing, signal processing, application processing and networking processing. It also processes other functions for the mobile terminal(s) of the present invention.

FIG. 3 introduces to utilize a computer server, with Internet access, as a Virtual Mobile Server for the mobile terminal of the present invention, wherein the key disclosures are:

The Virtual Mobile Server, basically a Computer Server, has a fixed Home IP address or an assigned roaming IP address by the aforementioned Home IP address, connecting to the wireline Internet through Fibre, Cable Modem, Ethernet or DSL (Digital Subscriber Loop), but not limited thereto. This virtual mobile server becomes the mobile cloud server for one or multiple mobile terminals, as set forth above, which become the mobile cloud clients.

The Virtual Mobile Server, as set forth above, comprises an important Terminal Processing Unit in operating the OWA Interface processing, Signal processing, Application processing and Networking processing for the mobile terminal, as set forth above. The abovementioned Virtual Mobile Server tries to handle the processing tasks for the mobile terminal, as set forth above, as much as possible when the IP connection is established between them in order to simplify the system implementation and improve the system performance of the mobile terminal, as set forth above.

The aforementioned Terminal Processing Unit connects to the aforementioned mobile terminal through traditional IP connection, improved IP connection such as IPv6 or other Packet Division Multiplexed (PDM) network connection.

The Virtual Mobile Server, as set forth above, maintains an updated and real-time copy of the Connection Table from the aforementioned Mobile Switching Center (MSC) or Mobile Gateway.

The Virtual Mobile Server, as set forth above, also synchronizes with the aforementioned mobile terminal when the IP connection is established between them.

One Virtual Mobile Server, as set forth above, can support one or multiple mobile terminals of the present invention, wherein many such mobile terminals can share the same Virtual Mobile Server, as set forth above.

The Virtual Mobile Server, as set forth above, supports such important services and applications as "Mobile Secretary", "Mobile Office", "Mobile Internet Optimization", "Mobile Internet Applications", "Voice/Video server", "Short Message Service (SMS) and Multimedia Message Service (MMS) server", "Game Center", "Document Center" "SDM Center", etc., but not limited thereto.

The aforementioned Mobile Internet Optimization module processes the improved mobile Internet browsing, searching, networking, accelerating, computing and other applications for the aforementioned mobile terminal either in the synchronized mode when the IP connection is available, or in the unsynchronized mode when the IP connection is not available.

The Virtual Mobile Server, as set forth above, also provides the mobile terminal of the present invention of Special Services Management such as Location management, Emergency call management, Security and Safety management, Sensor Networks and Systems management, Access Optimization, Digital spectrum management, and mobile cloud Operation and Maintenance management, etc., but not limited thereto.

The Virtual Mobile Server, as set forth above, can manage the aforementioned mobile terminal(s) to organize a sensor networks when the IP connection is available between the virtual mobile server and the mobile terminal(s), as set forth above.

The Virtual Mobile Server, as set forth above, can manage or control one or multiple aforementioned mobile terminal(s) connect to another or other multiple aforementioned mobile terminal(s) in an Ad-Hoc or Mesh network manner when the IP connection is available.

The mobile terminal, as set forth above, frequently reports its current terminal IP address (or called Visitor IP address) to the aforementioned virtual mobile server when the IP connection is established, and this aforementioned terminal IP address is updated in the aforementioned virtual mobile server when the aforementioned mobile terminal moves to different access point of wired network, wireless LAN, wireless PAN or wireless MAN (or called BWA).

Lastly, any computer server with Internet connection and with an IP address can be configured to be an aforementioned Virtual Mobile Server, associated with the mobile terminal(s) of the present invention.

The OWA Virtual Mobile Server as the Mobile Cloud Server of the present invention is not meant to be limited to the aforementioned system architecture, and the subsequent specific description utilization and explanation of certain characteristics previously recited as being characteristics of this system architecture are not intended to be limited to such technologies.

FIG. 4 is the transmission framework of the OWA Interface for the OWA mobile cloud architecture, wherein the aforementioned OWA Interface comprises:
1. OWA Baseband Signal Processing (SIG) Interface including OWA SIG Header, OWA SIG Information Body and OWA SIG End
2. OWA Application Processing (APP) Interface including OWA APP Header, OWA APP Information Body and OWA APP End
3. OWA Networking Processing (NET) Interface including OWA NET Header, OWA NET Information Body and OWA NET End The aforementioned OWA Interface is an open module to maximize the transmission efficiency between the aforementioned mobile terminal and the aforementioned virtual mobile server. The aforementioned OWA Interface can be minimized or reduced if any processing task (SIG, APP or NET, as set forth above) is not requested or not in use, in order to further increase the transmission efficiency and reduce the transmission overhead.

The aforementioned OWA Interface is the communication information interface between the aforementioned mobile terminal and the aforementioned virtual mobile server.

FIG. 5 describes the OWA Application Optimizer in the OWA mobile terminal system of the present invention.

To simplify the mobile terminal design and implementation, it is necessary to move the processing tasks out of the mobile terminal system, and to the mobile cloud server which in the present invention called virtual mobile server. Application processing including video processing, multimedia processing, gaming processing, mobile Internet processing, but not limited thereto, consumes much processing power and system resources for the mobile terminal, and therefore degrades the system performance.

When the IP connection is established between the aforementioned mobile terminal and the aforementioned virtual mobile server, the aforementioned OWA Application Optimizer moves the rich applications (large data, video, big file, web, multimedia, etc.) processing tasks remotely to the aforementioned virtual mobile server for processing, then retrieve the processing results back to the aforementioned mobile terminal or save the results in the aforementioned virtual mobile server.

When the IP connection is not available between the aforementioned mobile terminal and the aforementioned virtual mobile server, the aforementioned OWA Application Optimizer limits the applications to voice, message and text locally in the aforementioned mobile terminal. In this case (no IP connection is available), the aforementioned OWA Application Optimizer may request the aforementioned MSC or Mobile Gateway to reroute the incoming rich mobile call which consumes much processing power and/or transmission bandwidth, such as video call, big file, large data, etc., to the aforementioned virtual mobile server directly without proceeding to the aforementioned mobile terminal to save system and transmission resources. Then, after the IP connection is established between the aforementioned mobile terminal and the aforementioned virtual mobile server, the aforementioned mobile terminal can retrieve the incoming calls from the aforementioned virtual mobile server.

The IP connection, as set forth above, refers to the connection to the wireline network, wireless LAN, wireless PAN or wireless MAN (BWA), as set forth above, which is a broadband high-speed connection to the Internet.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An OWA (open wireless architecture) Mobile Cloud Architecture system comprising:
   a) Virtual Mobile Server (VMS) as Mobile Cloud Server with Home IP (Internet Protocol) address or assigned roaming IP address by said Home IP address, comprising
      i. Terminal Processing Unit utilizing OWA (open wireless architecture) Interface processing, Signal processing, Application processing and Networking processing for mobile terminal (MT),
      ii. Terminal Application and Service function modules including mobile secretary, mobile office, mobile Internet, Voice and Video, short message service (SMS) and multimedia message service (MMS) and information center,
      iii. Special terminal services management modules including location management, security and safety management, access optimization, digital spectrum management, sensors management and mobile cloud O&M (operation and maintenance) management,
      iv. SDM (software defined module) Center providing on-line secured Internet downloading of SDM modules, and
   b) Wireless Mobile Terminal (MT) as Mobile Cloud Client connecting to said VMS through either an IP connection or a cellular wireless connection, comprising
      i. OWA Interface Unit defining information transmission interfaces with said VMS,
      ii. OWA SDM (software defined module) supporting different and multiple wireless standards stored in internal system memory, SDM external memory and processing card or transferred to/from said SDM center in said VMS,
      iii. OWA Core supporting basic multi-dimensional OWA open baseband signal processing of multiple wireless standards,
      iv. NIU (network interface unit) providing wireline network connection and wired communication interface to connect to said VMS,
      v. OWA Application Processing Optimizer scheduling processing for basic applications locally in said MT or rich applications remotely through said VMS.

2. A system as recited in claim 1 wherein said Terminal Processing Unit in said VMS processes said OWA Interface, said Signal processing, said Application processing and said Networking processing for said MT when said IP connection is available between said VMS and said MT.

3. A system as recited in claim 1 wherein said OWA Application Processing Optimizer comprising:
   a) Sub-module processing rich applications including data, video, file, web, multimedia and Internet applications through said Terminal Processing Unit in said VMS if said IP connection is available between said MT and said VMS, or
   b) Sub-module processing basic applications including voice, message and text, etc locally in said MT if said IP connection is not available between said MT and said VMS.

4. A system as recited in claim 1 wherein said OWA Application Processing Optimizer further comprising:
   a) Sub-module requesting associating MSC (mobile switching center), Mobile Gateway or Mobile Router to reroute incoming mobile application call directly to said VMS without proceeding to said MT if said IP connection is not available and said incoming application call consumes too much wireless bandwidth or system resources of said MT,
   b) Sub-module retrieving said incoming application call from said VMS whenever said IP connection is available,
   c) Sub-module requesting said VMS managing mobile application processing for said MT when said IP connection is available.

5. A system as recited in claim 1 wherein said VMS can be any computer server with Internet connection and with an IP address including Home IP address or assigned roaming IP address by said Home IP address.

6. A system as recited in claim 1 wherein one said VMS can support one or multiple said MTs and many said MTs can share same said VMS.

7. A system as recited in claim 1 wherein said OWA SDM is a portable open module containing necessary parameters, algorithms, protocols and data of one or multiple wireless air interfaces installed from said SDM external memory and processing card or downloaded from said SDM Center in said VMS.

8. A system as recited in claim 1 wherein said OWA Core in said MT minimizes its local signal processing by allocating processing tasks to said Terminal Processing Unit in said VMS through said OWA Interface when said IP connection is available.

9. A system as recited in claim 1 wherein said OWA Application Processing Optimizer in said MT minimizes its local application processing by allocating processing tasks to said Terminal Processing Unit in said VMS through said OWA Interface when said IP connection is available.

10. A system as recited in claim 1 wherein one or multiple said MT(s) can connect to another or other multiple said MT(s) in an Ad-Hoc network or a Mesh network managed or controlled by said VMS when said IP connection is available.

11. A system as recited in claim 1 wherein said IP connection includes traditional Internet Protocol (IP) connection, improved Internet Protocol connection including IPv6 (IP version 6) and any packet division multiplexed (PDM) protocol connection.

12. A system as recited in claim 1 wherein said OWA Interface unit is an open software unit to optimize information transmission efficiency between said MT and said VMS, and can be minimized or reduced if any processing task is not requested or not in use.

13. A system as recited in claim 1 wherein said MT reports current Terminal IP address of said MT to said VMS when said IP connection is established, and said Terminal IP address is updated in said VMS when said MT moves to different access point of network, wireless LAN (local area network), BWA (broadband wireless access network) or wireless PAN (personal access network).

14. A system as recited in claim 13 wherein said MT establishes said IP connection through fully said wired network or combination of said wired network and said wireless LAN, said wireless PAN, said BWA wherein said wireless LAN, said wireless PAN or said BWA is in short range local access area or metropolitan access area of said MT.

15. A system as recited in claim 13 wherein said MT searches for network access status based on pre-defined search criteria and network access priority order set by user wherein a default access priority order from high to low is said wired network, said wireless LAN, said wireless PAN, said BWA and mobile cellular network.

16. A system as recited in claim 15 wherein said MT frequently searches for higher priority network access mode whenever connection is in low priority mode to optimize network access performance and maximize broadband transmission for said MT.

* * * * *